US007777854B2

(12) United States Patent  (10) Patent No.: US 7,777,854 B2
Moon  (45) Date of Patent: Aug. 17, 2010

(54) LIQUID CRYSTAL DISPLAY, TESTING METHOD THEREOF AND MANUFACTURING METHOD THEREOF

(75) Inventor: Sung-Jae Moon, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/646,008

(22) Filed: Aug. 22, 2003

(65) Prior Publication Data

US 2004/0119925 A1  Jun. 24, 2004

(30) Foreign Application Priority Data

Aug. 23, 2002  (KR) ............... 10-2002-0050134

(51) Int. Cl.
*G02F 1/1345* (2006.01)
*G09G 3/36* (2006.01)
(52) U.S. Cl. ............... 349/149; 349/150; 349/151; 349/152; 345/90; 345/104
(58) Field of Classification Search ......... 349/149–150, 349/152; 345/104, 90
See application file for complete search history.

(56) References Cited

U.S. PATENT DOCUMENTS 5,671,026 A * 9/1997 Shiraki et al. ............... 349/40
5,712,493 A * 1/1998 Mori et al. ............... 257/59
6,005,647 A * 12/1999 Lim ............... 349/40
6,111,620 A * 8/2000 Nishiki et al. ............... 349/54
6,172,410 B1 * 1/2001 Nagata et al. ............... 257/620
6,636,288 B2 * 10/2003 Kim et al. ............... 349/139
2001/0015709 A1 * 8/2001 Imajo et al. ............... 345/87
2003/0117536 A1 * 6/2003 Jeon ............... 349/40

FOREIGN PATENT DOCUMENTS

| JP | 11352505 A | 12/1999 |
| JP | 2001053282 A | 2/2001 |
| JP | 2001174849 A | 6/2001 |
| KR | 1020000014516 A | 3/2000 |
| KR | 1020000074833 A | 12/2000 |
| KR | 1020020056621 A | 7/2002 |

* cited by examiner

*Primary Examiner*—Hoan C Nguyen
(74) *Attorney, Agent, or Firm*—Cantor Colburn LLP

(57) ABSTRACT

An LCD device of the present invention includes a liquid crystal panel and a gate driving signal wire. The panel includes a gate wire having a plurality of gate lines, and the gate driving signal wire is connected to the gate lines by connecting lines. Therefore, spatial rooms for a panel assembly increase because additional test wire and test pad for VI test can be eliminated. Furthermore, accuracy of the VI tests is enhanced.

13 Claims, 11 Drawing Sheets

LIQUID CRYSTAL DISPLAY, TESTING METHOD THEREOF AND MANUFACTURING METHOD THEREOF

BACKGROUND OF THE INVENTION a) Field of the Invention

The present invention relates to a liquid crystal display (LCD), a testing method thereof and a manufacturing method thereof.

b) Description of Related Art

Liquid crystal displays (LCDs) are the most commonly used flat panel displays (FPDs) handy to carry.

A typical liquid crystal display (LCD) includes a pair of panels having field-generating electrodes and polarizers, and a liquid crystal layer having dielectric anisotropy, which is interposed between the two panels and subject to electric field generated by the electrodes. The variation of the field strength changes molecular orientations of the liquid crystal layer, which tend to align parallel or perpendicular to the field direction. The LCD passes light through the liquid crystal layer via the polarizers and re-orients the liquid crystal molecules to change the polarization of the light. The polarizers convert the change of the polarization into the change of the light transmittance and enable to obtain desired images.

Pluralities of gate lines and data lines are respectively arranged in row and column directions on a panel that has TFTs formed thereon. Pixel electrodes are connected to the gate lines and data lines through the TFTs. The TFT controls transmission of data signal to the pixel electrode under the control of a gate signal received through the gate line. The gate signal is produced at a plurality of gate driving ICs (integrated circuits). The gate driving IC receives a gate-on voltage and a gate-off voltage from a driving voltage generator having one or more DC/DC converters, and combines them to produce the gate signal under the control of a signal controller. The data signal is produced at a plurality of data driving ICs by converting image signal of the signal controller to analogue voltage.

The signal controller, the driving voltage generators, etc. are provided on a printed circuit board (PCB) that is usually disposed to the outside of the panel, and the driving ICs are arranged on a flexible printed circuit (FPC) film disposed between the panel and the PCB. An LCD is usually provided with two PCBs, where one is disposed at an upper side of the panel, and the other at a left side thereof. The left one is called as a gate PCB, and the upper one is called a data PCB. The gate driving ICs, being disposed between the gate PCB and the panel, receive signals from the gate PCB, and the data driving ICs, being disposed between the data PCB and the panel, receive signals from the data PCB.

Such a gate PCB may be dismissed such that only the data PCB is adopted. In this case, the positions of the gate side FPC film and the gate driving ICs formed thereon may be remained. In the case that such a gate PCB is dismissed, separate wire should be provided on the data FPC film and the panel as well as on the gate FPC film, in order to enable transmission of signals from the signal controller, driving voltage generator, etc. to every gate driving IC.

Furthermore, the gate driving ICs may be formed directly on a liquid crystal panel assembly (chip on glass—COG-type) such that a gate side FPC film may also be dismissed. In this case, separate wire should be provided on the data FPC film and the panel.

Meanwhile, a visual inspection (VI) test is executed to inspect operation of a manufactured LCD. For a VI test of an LCD having the above-described structure, additional test wire and test pad connected to the gate line should be prepared at the panel. The size of the test pad should be more than a predetermined dimension, e.g., 800 μm×800 μm, to ensure sufficient reliability of the VI test.

However, rooms for the test wire and test pad is becoming insufficient since the size of an LCD is tried to be reduced, and accordingly difficulty in VI test is increasing.

On the other hand, even if there is enough room for the test wire and the test pad, signal wire arrangement should be altered in order to prevent interference therebetween.

The alteration of signal wire for VI test may cause lengthening of lines in signal wire and increasing of wire resistance, and accordingly, may adversely influence normal signal transmission. Time delay that is increased due to distance between the gate line and the test pad may also deteriorate accuracy of the VI test.

SUMMARY OF THE INVENTION

Therefore, the motivation for the present invention is to provide non-limiting advantages of enhanced rooms and reduced signal delay to an LCD device without harming enablement of VI tests thereof.

An exemplary LCD device useful with the present invention includes: a liquid crystal panel including a first display signal wire having a plurality of a first display signal lines, a second signal wire having a plurality of a second display signal lines that cross the first display signal lines, a plurality of switching elements each of which is connected to both of one of the first display signal lines and one of the second display signal lines, and pixel electrodes connected to the switching elements; a first driving signal wire transmitting driving signals for the first or second display signal lines, wherein the first driving signal wire is separated from the first and second display signal wires, the switching elements, and the pixel electrodes, and includes a first pad connected thereto at its near end; and a plurality of first connecting lines disposed between the first driving signal wire and at least part of the first display signal wire, and connected to at least one of the first driving signal wire and the part of the first display signal wire.

In a further embodiment, an LCD device further includes a plurality of drivers respectively connected to the first driving signal wire.

It is preferable that each of the drivers is in the form of a chip and each of the drivers is formed on the liquid crystal panel.

It is further preferable that each of the drivers is directly connected to the first driving signal wire.

In another further embodiment, an LCD device further includes a plurality of flexible printed circuit films connected electrically and physically to the liquid crystal panel, wherein the drivers are mounted on the flexible printed circuit films.

In another further embodiment, an LCD device further includes a second driving signal wire transmitting driving signals for the first or second display signal lines, wherein the second driving signal wire is separated from the first and second display signal wires, the switching elements, and the pixel electrodes, and includes a second pad connected thereto at its near end.

In this case, a distance between the first driving signal wire and the first display signal wire is preferably smaller than a distance between the second driving signal wire and the first display signal wire.

Preferably, an LCD device further includes a plurality of second connecting lines disposed between the second driving signal wire and at least another part of the first display signal wire, and connected to at least one of the second driving signal wire and the above mentioned another part of the first display signal wire. Here, it is preferable that the first and second connecting lines are alternately disposed.

It is preferable that one end of the connecting line is connected to the first display signal wire, and another end thereof is connected to the first driving signal wire.

The first connecting line may include two sections that are electrically separated each other, and in this case, it is preferable that the two sections are respectively connected to the first display signal wire and the first driving signal wire.

Or in any other way, it is preferable that the first connecting line is electrically connected to the first display signal wire and the first driving signal wire.

An LCD device of a further embodiment includes a shorting bar connected to the first driving signal wire.

Preferably, the first driving signal wire further includes a plurality of second pads connected thereto at its intermediate portion.

It is also preferable that the first driving signal wire is formed as a same layer with the second display signal wire, the first connecting line comprises a connecting member that is formed as a same layer with the pixel electrodes, and the connecting member is connected to the first driving signal wire.

It is also preferable that the first driving signal wire is formed as a same layer with the first display signal wire, and at least part of the first connecting lines are formed as a same layer with the display signal wire.

The first driving signal wire preferably extends to an edge of the panel.

It is preferable that the first display signal wire transmits gate signals for turning on and off the switching elements, and the second display signal wire transmits data signals for the pixel electrodes applied through the switching elements.

The first driving signal wire preferably transmits a gate-off voltage or a ground voltage.

It is preferable that the first display signal wire transmits data signals for the pixel electrodes, and the second display signal wire controls turning on and off of the switching elements such that the transmission of the data signals to the pixel electrodes is controlled.

The first driving signal wire preferably transmits gray voltages, a clock signal, or a driving voltage to the drivers.

As a test method for an LCD device including a first display signal wire having a plurality of a first display signal lines, a second signal wire having a plurality of a second display signal lines that cross the first display signal lines, a plurality of switching elements each of which is connected to both of one of the first display signal lines, pixel electrodes connected to the switching elements, and a driving signal wire including first and second pads respectively connected to the first signal wire at a near end thereof and at an intermediate portion thereof, an exemplary test method of an LCD device useful with the present invention includes: driving the pixel electrodes through the switching elements by applying a first test signal to the first pad and a second test signal to the second pad; and cutting the connection between the driving signal wire and the first display signal wire.

A manufacturing method of an LCD device useful with the present invention includes: manufacturing a liquid crystal display panel including the liquid crystal display device comprising a first display signal wire having a plurality of a first display signal lines, a second signal wire having a plurality of a second display signal lines that cross the first display signal lines, a plurality of switching elements each of which is connected to both of one of the first display signal lines, pixel electrodes connected to the switching elements, a driving signal wire that is separated from the first and second display signal wires and includes first and second pads respectively connected to the first signal wire at a near end thereof and at an intermediate portion thereof, and a plurality of connecting lines connected to the first display signal wire and the driving signal wire; driving the pixel electrodes through the switching elements by applying a first test signal to the first pad and a second test signal to the second pad; and cutting the connecting lines.

In a further embodiment, a manufacturing method of an LCD device further includes forming a shorting bar connected to the first driving signal wire, and eliminating the shorting bar after manufacturing the liquid crystal display panel.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
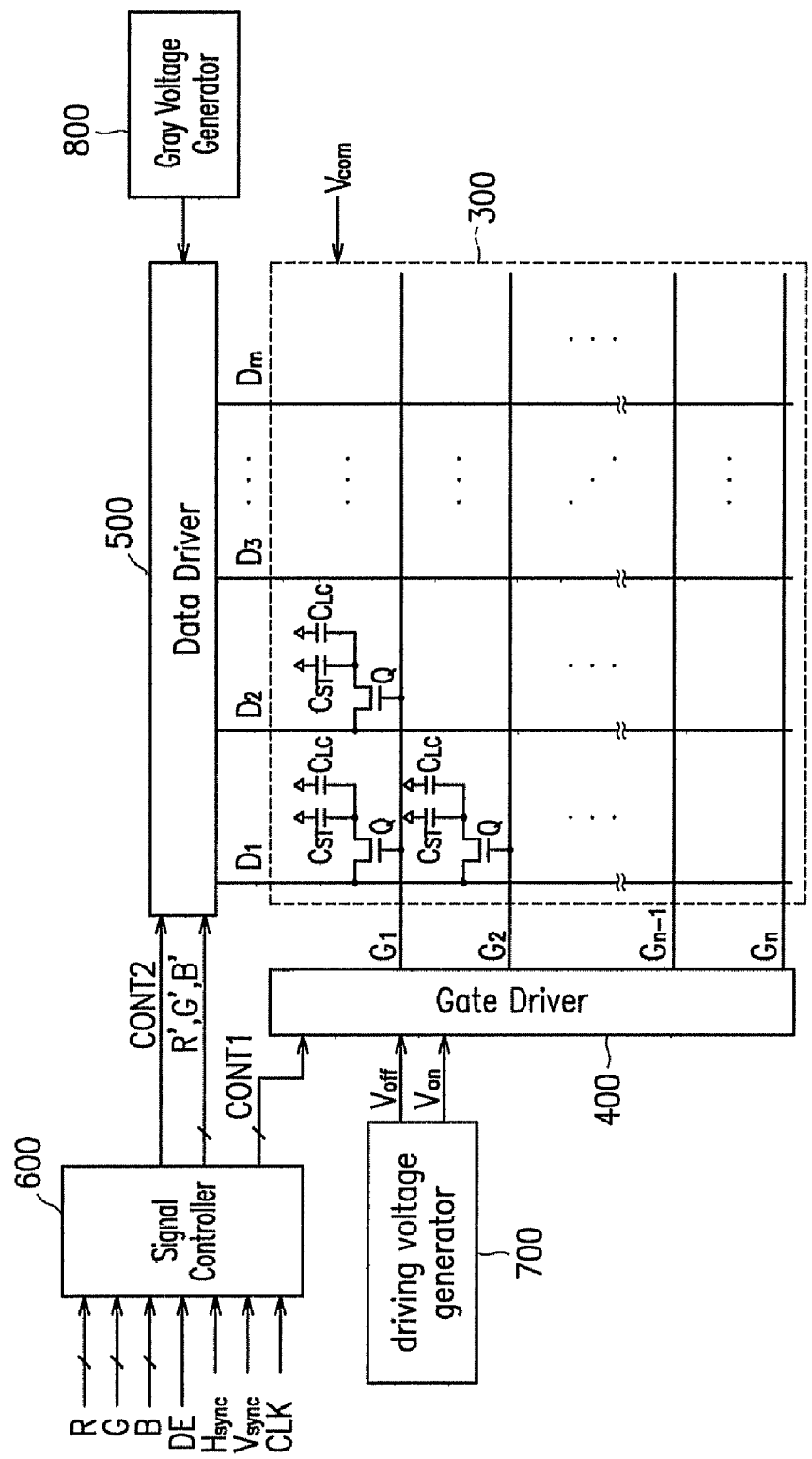
FIG. 1 is a block diagram of an LCD according to a preferred embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein.

In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Then, liquid crystal displays, testing methods thereof, and manufacturing methods thereof according to embodiments of the present invention will be described with reference to the drawings.

Figure 2:
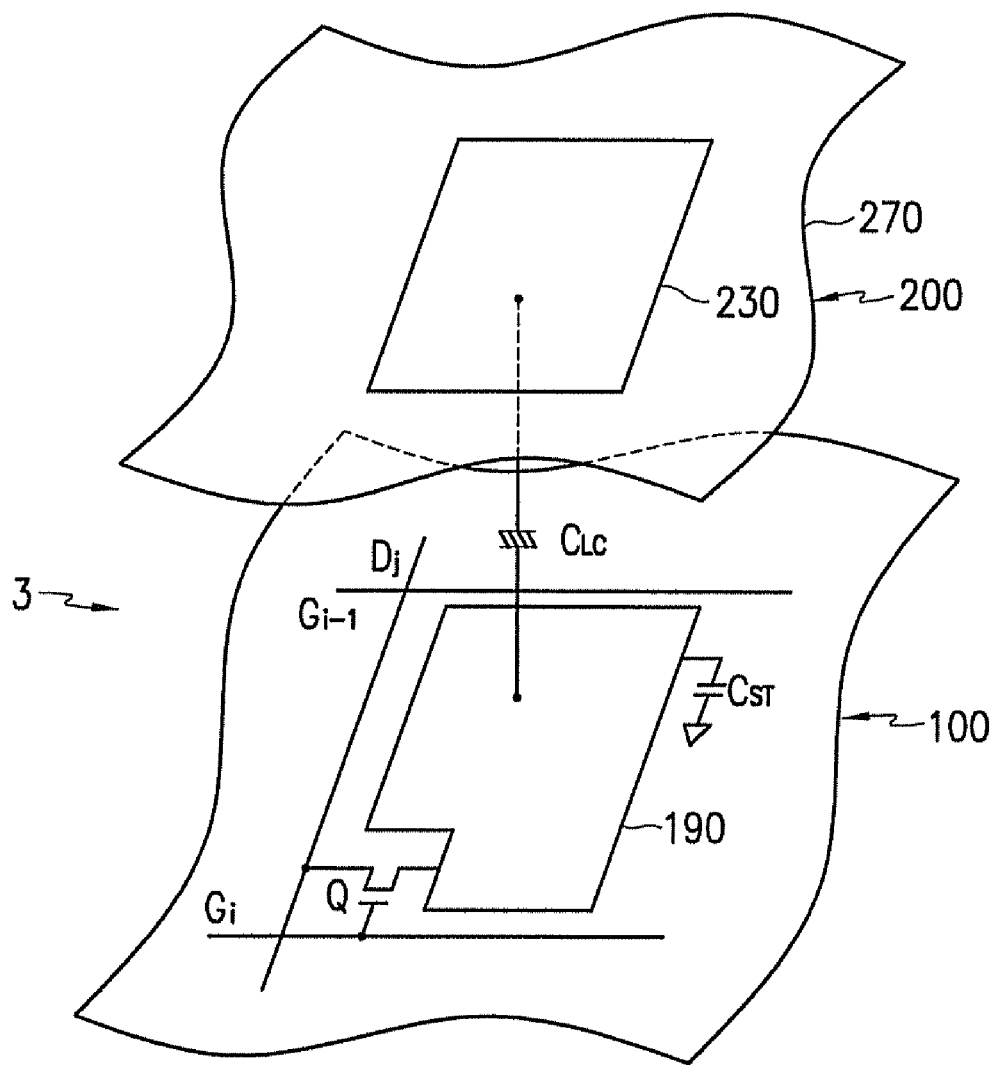
FIG. 2 is an equivalent circuit for a pixel of an LCD according to a preferred embodiment of the present invention.

FIG. 1 is a block diagram of an LCD according to an embodiment of the present invention, and FIG. 2 is an equivalent circuit diagram for a pixel of an LCD according to an embodiment of the present invention.

Referring to FIG. 1, an LCD according to a preferred embodiment of the present invention includes a liquid crystal panel assembly 300, a gate driver 400 and a data driver 500 both connected to the assembly 300, a driving voltage generator 700 connected to the gate driver 400, a gray voltage generator 800 connected to the data driver 500, and a signal controller 600 for the control of the LCD.

The liquid crystal panel assembly 300 includes a plurality of display signal lines $G_1$-$G_n$ and $D_1$-$D_m$ and a plurality of pixels connected thereto and arranged substantially in a matrix. In a structural viewpoint, the panel assembly 300 includes a lower panel 100 and an upper panel 200 in pair, and a liquid crystal layer 3 disposed therebetween.

The display signal lines $G_1$-$G_n$ and $D_1$-$D_m$ are provided on the lower panel 100 and include a plurality of gate lines $G_1$-$G_n$ transmitting gate signals (called "scanning signals") and a plurality of data lines $D_1$-$D_m$ transmitting data signals. The gate lines $G_1$-$G_n$ extend substantially in a row direction and are almost parallel to one another, while the data lines $D_1$-$D_m$ extend in a column direction and are also almost parallel to one another.

Each pixel includes a switching element Q connected to the signal lines $G_1$-$G_n$ and $D_1$-$D_m$, and a pair of capacitors, i.e., a liquid crystal capacitor $C_{LC}$ and a storage capacitor $C_{ST}$ that are connected to the switching element Q. The storage capacitor $C_{ST}$ is possibly dismissed depending on embodiments.

The switching element Q is provided on the lower panel 100 and has three terminals: a control terminal connected to the gate lines $G_1$-$G_n$; an input terminal connected to the data lines $D_1$-$D_m$; and an output terminal connected to both of the liquid crystal capacitor $C_{LC}$ and storage capacitor $C_{ST}$. FIG. 2 illustrates the switching element Q as a MOS transistor as an example, and the MOS transistor is realized by a TFT that has its channel layer of amorphous silicon or polysilicon.

The liquid crystal capacitor $C_{LC}$ has two terminals of a pixel electrode 190 on the lower panel 100 and a common electrode 270 on the upper panel 200, and the liquid crystal layer 3 disposed between the two electrodes 190 and 270 functions as dielectric medium. The pixel electrode 190 is connected to the switching element Q. The common electrode 270 covers the entire surface of the upper panel 200 and receives a common voltage $V_{com}$.

Differently from FIG. 2, the common electrode 270 may be formed on the lower panel 100, and in this case, the two electrodes 190 and 270 have linear or bar-shaped pattern.

The storage capacitor $C_{ST}$, functioning as a capacitor for providing capacitance additionally to that of the liquid crystal capacitor $C_{LC}$, includes the pixel electrode 190 and a separate wire (not shown) on the lower panel 100, which overlaps the pixel electrode 190 via an insulator and receives a predetermined voltage such as the common voltage $V_{com}$. Instead of the separate wire, the storage capacitor $C_{ST}$ may include an adjacent gate line (which is frequently called a previous gate line) that overlaps the pixel electrode 190 via an insulator.

For color display, each pixel represents its own color by providing one of a plurality of red, green and blue color filters 230 in an area occupied by the pixel electrode 190. The color filter 230 shown in FIG. 2 is provided in an area on the upper panel 200 facing the pixel electrode 190. Alternatively, the color filter 230 is on or below the pixel electrode 190 on the lower panel 100.

A polarizer or polarizers (not shown) are attached to the outer surfaces of the lower panel 100 and the upper panel 200.

Referring back to FIG. 1, the driving voltage generator 700 having one or more DC/DC converters, generates a gate-on voltage $V_{on}$ for turning on the switching element Q and a gate-off voltage $V_{off}$ for turning it off.

Although not shown in the drawings, a common voltage generator may be added to generate the common voltage ($V_{com}$) from a voltage of the DC/DC converter.

The gray voltage generator 800 generates two sets of plural gray voltages related to the transmittance of the pixels. The gray voltages in one set have a positive polarity relative to the common voltage $V_{com}$, while those in the other set have a negative polarity relative thereto.

The gate driver 400, which is also called a scan driver, is connected to the gate lines $G_1$-$G_n$ of the liquid crystal panel assembly 300 such that it produces gate signals as a combination of the gate-on voltage Von and the gate-off voltage $V_{off}$ from the driving voltage generator 700, and applies the gate signals to the gate lines $G_1$-$G_n$.

The data driver 500, which is also called a source driver, is connected to the data lines $D_1$-$D_m$ of the panel assembly 300 and applies data signals selected from the gray voltages from the gray voltage generator 800 to the data lines $D_1$-$D_m$.

The signal controller 600 controls the gate driver 400 and the data driver 500.

An exemplary detailed structure of the LCD shown in FIGS. 1 and 2 according to an embodiment of the present invention is hereinafter described with reference to FIGS. 3A and 3B.

Figure 3A:
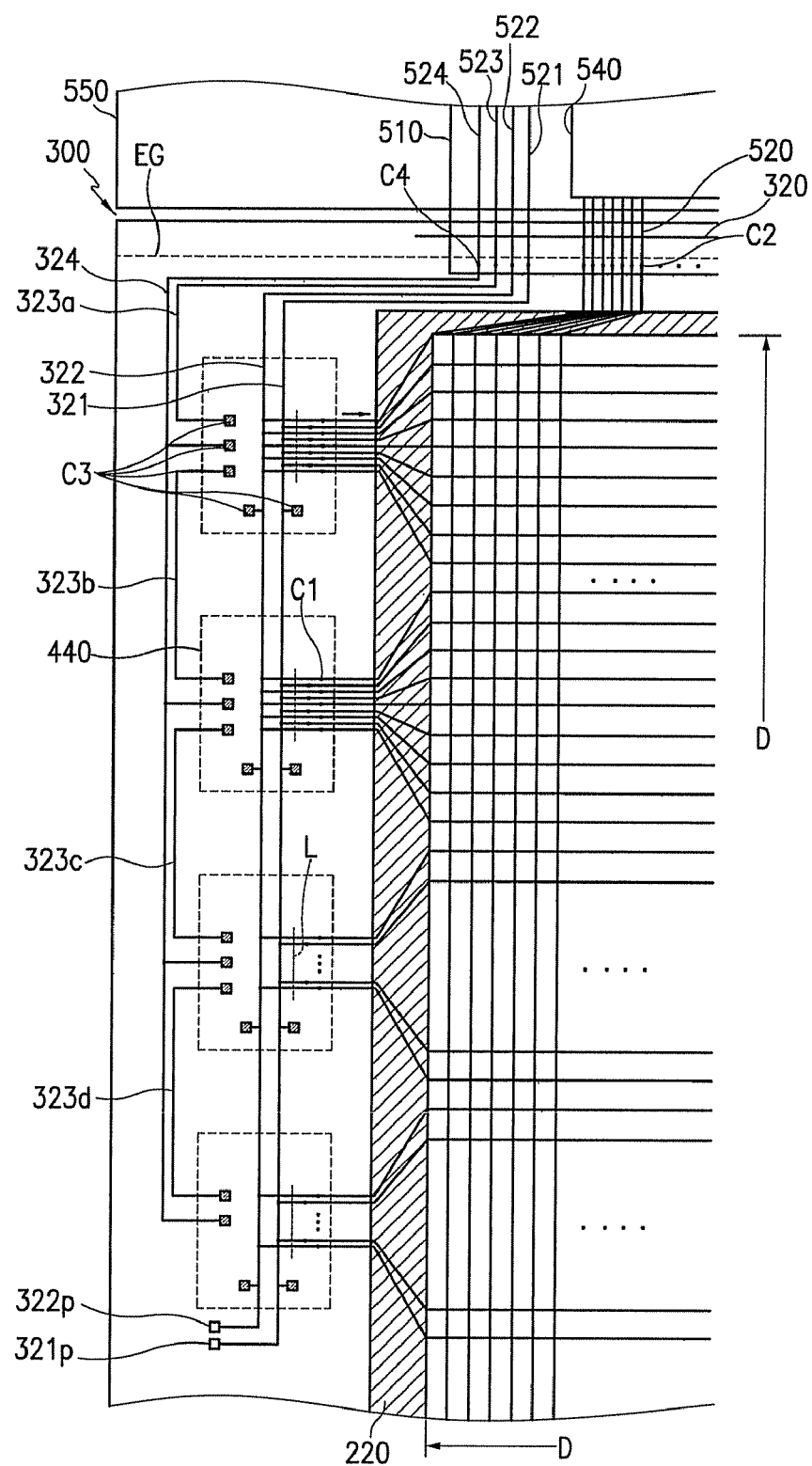
FIGS. 3A and 3B illustrate arrangements of an LCD according to preferred embodiments of the present invention.

FIG. 3A is a schematic layout view of an LCD according to an embodiment of the present invention.

As shown in FIG. 3A, a PCB 550 is disposed above the liquid crystal panel assembly 300 having the gate lines $G_1$-$G_n$ and the data lines $D_1$-$D_m$ thereon. Circuital components such as the signal controller 600, the driving voltage generator 700, and the gray voltage generator 800 are provided on the PCB 550. The liquid crystal panel assembly 300 and the PCB 550 are interconnected electrically and physically by a plurality of data FPC films 510.

Each data FPC film 510 is provided with a data driving IC 540 mounted thereon and a plurality of data leads 520 and a plurality of gate driving signal lines 521-524. The data leads 520 are connected to output terminals of the data driving IC 540 and to the data lines $D_1$-$D_m$ at contact portions C2, and transmits data signals from the data driving IC 540 to the data lines $D_1$-$D_m$.

Figure 3B:
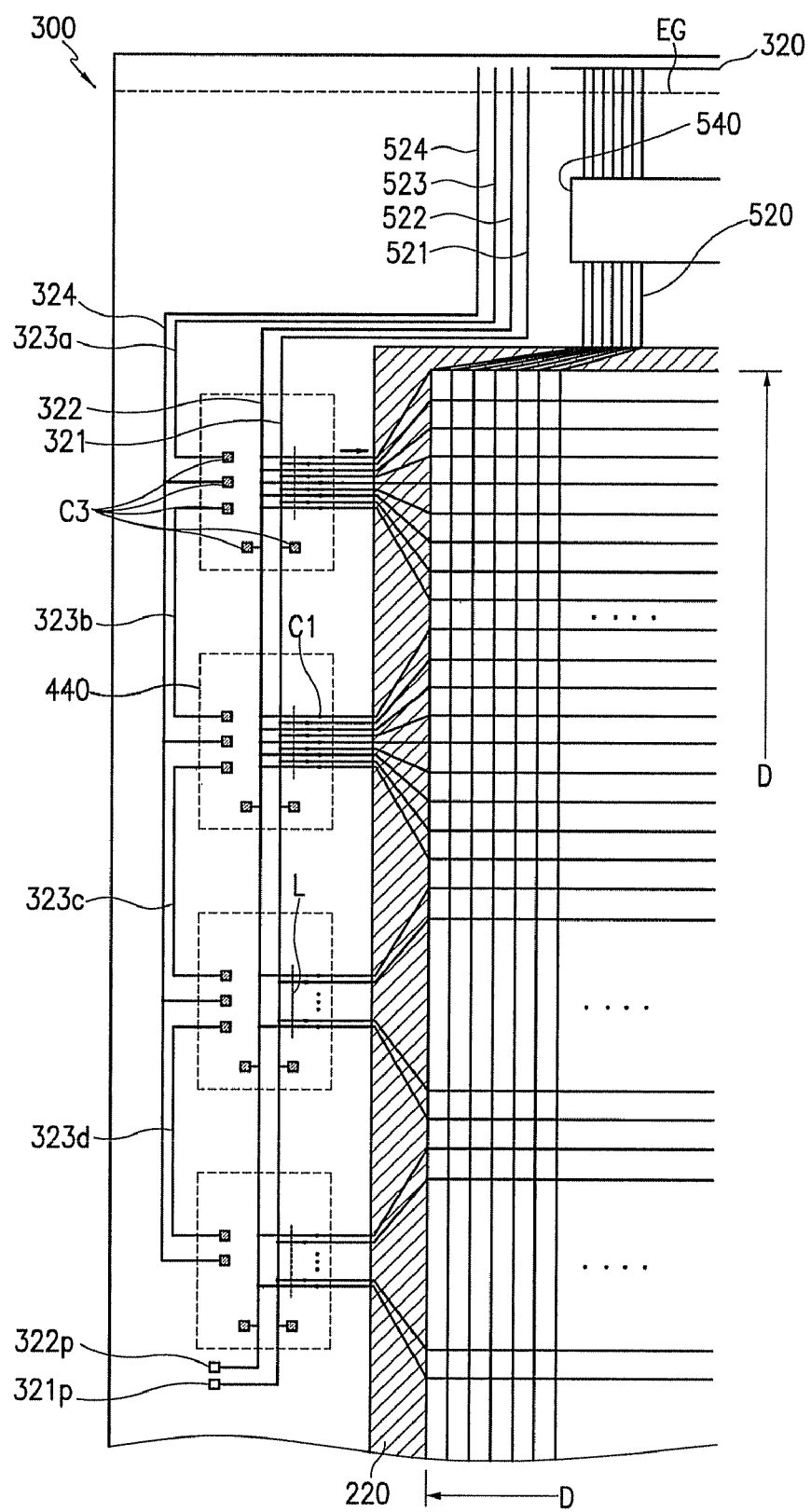

Although FIGS. 3A and 3B show only four gate driving signal lines 521-524 for illustrational purpose, the actual number thereof may be equal to or larger than five.

The signal line 521 transmits the gate-off voltage Voff, and the signal line 522 transmits a ground voltage. The signal line 523 transmits signals such as vertical synchronization start signals, and the signal line 524 transmits signals, e.g., the gate-on voltage Von and/or gate clock signals. The signal lines 521-524 as well as the data driving IC 540 are connected to circuital components of the PCB 550. The signal lines 521-524 are described later in further detail.

In addition to the data FPC film 510, a FPC film (not shown) without a data driving IC 540 may be attached to the PCB 550 and the liquid crystal panel assembly 300. In this case, the gate driving signal lines 521-524 may be provided on the additional FPC film.

As shown in FIGS. 3A and 3B, a plurality of pixel areas defined by the intersections of the transversely extending gate lines $G_1$-$G_n$ and the longitudinally extending data lines $D_1$-$D_m$ form a display area D on the panel assembly. A black matrix 220 (indicated by hatched area) for blocking light leakage exterior to the display area is provided around the display area D. Although the gate lines $G_1$-$G_n$ or the data lines $D_1$-$D_m$ extend substantially parallel to each other in the display area D, they close each other group by group like a fan such that distance between adjacent signal lines become reduced. And then, the signal lines become nearly parallel again.

Referring to FIG. 3A, four gate driving ICs 440 are mounted on the liquid crystal panel assembly 300 near its left edges marginal portion outside of the display area D and arranged in the column direction. A plurality of gate driving lines 321, 322, 323a-323d and 324 are formed in the vicinity of the gate driving ICs 440. Some gate driving signal lines 321, 322, and 324 are electrically connected to respective gate driving signal lines 521, 522, and 524 of the data FPC film 510 via contact portions C4 located near the upper edge of the assembly panel 300, and they are also connected to input terminals of the gate driving ICs 440 via contact portions C3. The contact portions C3 are positioned at one ends of branches of the respective driving signal lines 321, 322 and 324, or are positioned on the respective lines 321, 322 and 324. The contact portions C3 for the lines 321 and 322 may lie directly on the lines 321 and 322 because the lines 321 and 322 have large line width. The size of contact portions C3 on those lines 321 and 322 can have bigger dimension than other contact portions C3.

The uppermost signal line 323a among signal lines 323a-323d is connected to the gate driving signal line 523 of the data FPC film 510 via the contact portion C4, and is also connected to the input terminal of the uppermost gate driving IC 440 via the contact portion C3. Remnant signal lines 323b-323d are connected to input/output terminals of adjacent gate driving ICs 440 via contact portions C3. The gated signal lines 321, 322, 323a-323d and 324 lie under the gate driving ICs 440 or positioned outside thereof.

The two lines 321 and 322 among the gate driving signal lines 321, 322, 323a-323d and 324, which are adjacent to the display area D, are connected to the gate lines via contact portions C1. In more detail, the two signal lines 321 and 322 are alternately connected to a series of gate lines. Test pads 321p and 322p are provided at lower ends of the respective signal lines 321 and 322. The lines 321 and 322 are larger in width than other lines 323a-323d and 324 because they receive the gate-off voltage Voff and the ground voltage, respectively.

A shorting bar 320 formed adjacent to the upper edge of the panel assembly 300 and extending in the longitudinal direction is connected to the gate driving signal lines 521-524 and the data lines for protection of the switching elements Q for electrostatic discharge protection of the switching elements Q. This shorting bar 320 is eliminated by edge grinding along a cutting line EG after completion of the panel assembly 300.

Although the figures show only one shorting bar 320 and four gate driving signal lines 321, 322, 323a-323d, and 324, it is notable that the numbers thereof may be varied.

At the contact portions C1-C4, the connections between signal lines 321, 322, 323a-323d and 324 and the gate lines $G_1$-$G_n$ the data lines $D_1$-$D_m$, and the signal lines 521-524 on the panel assembly 300 are realized by anisotropic conductive layer, which will be described later in more detail.

Different from the above described embodiment, the data driving ICs 540 may be mounted on the liquid crystal panel assembly 300 rather than on the data FPC film 510 as illustrated in FIG. 3B. In this case, a plurality of data driving ICs 540 are transversely arranged one after another on the panel assembly 300, and a plurality of data driving signal lines (not shown) transmitting control signals, gray voltages, etc., from an external device are provided on the panel assembly 300 and extend in the row direction. In addition, among the plurality of data driving signal lines, two lines that are closest to the data lines $D_1$-$D_m$ are alternately connected to the data lines $D_1$-$D_m$. Separate test pads are provided at ends of the respective data driving signal lines connected to the data lines $D_1$-$D_m$. Each data driving signal line connected to the data lines $D_1$-$D_m$ transmits the same signal to all the data driving ICs 540, and examples of the same signals are a clock signal, the gray voltages from the gray voltage generator 800, and the driving voltages such as ground voltage and supply voltage for the data driving ICs 540.

An LCD described in immediately above paragraph has almost the same structure and line connections with an LCD according to an embodiment described hereinafter, except that data driving signal lines and data lines $D_1$-$D_m$ are interconnected instead of the gate driving signal lines 321 and 322 and the gate lines $G_1$-$G_n$ being interconnected.

The operation of such an LCD is hereinafter described in further detail.

The signal controller 600 equipped on the PCB 550 receives, from an external graphic controller (not shown), RGB image signals R, G, and B and input control signals for controlling the display thereof. The input control signal may be exemplified by a vertical synchronization signal Vsync, a horizontal synchronization signal Hsync, a main clock CLK, and a data enable signal DE. The signal controller 600 generates gate control signals CONT1 and data control signals CONT2 and processes the image signal (R, G, and B) to be suitable for the operation of the panel assembly 300 based on the input image signals R, G and B and the input control signals. Subsequently, the signal controller 600 sends the gate control signals CONT1 to the gate driver 400, and sends the data control signals CONT2 and the processed image signals R', G', and B' to the data driver 500.

The gate control signals CONT1 include a vertical synchronization start signal STV that notifies start of a frame, a gate clock signal CPV that controls output timing of the gate-on voltage $V_{on}$, and an output enable signal OE that defines the duration of the gate-on voltage $V_{on}$. The data control signals CONT2 include a horizontal synchronization start signal STH that notifies start of a horizontal period, aloud signal LOAD or TP that triggers application of the data voltages to the data lines, an inversion control signal RVS that reverses polarity of the data voltages with respect to the common voltage $V_{com}$, and a data clock signal HCLK. Hereinafter, the polarity of the data voltage should be understood as being described with respect to the common voltage $V_{com}$, unless otherwise specified.

Meanwhile, the driving voltage generator 700 generates the gate-on voltage $V_{on}$ and the gate-off voltage $V_{off}$, while the gray voltage generator 800 generates a plurality of gray voltages and accordingly applies them to the data driver 500.

During this, signals such as the gate clock signal CPV and the output enable signal OE, included in the gate control signal CONT1, are supplied in parallel to the gate driving ICs 440 through the signal lines 524 and 324 and subsequently through the contact portions C3. Signals such as the vertical synchronization start signal STV are supplied to the first gate driving IC 440 through the signal lines 523 and 323a and subsequently through the contact portion C3.

In addition, the gate-off voltage $V_{off}$ and the ground voltage are supplied in parallel to the gate driving ICs 440 through the signal lines 521, 321, 522 and 322 and the contact portions C3.

The data driver 500 sequentially receives a packet of the image data R', G' and B' that are to be processed at one time, and converts the image data R', G' and B' into the analog data voltages selected from the gray voltages of the gray voltage generator 800 in response to the data control signals CONT2 from the signal controller 600.

Responsive to the gate control signals CONT1 from the signal controller 600, the gate driver 400 applies the gate-on voltage Von to the gate lines $G_1$-$G_n$, thereby turning on the switching elements Q connected thereto.

The data driver 500 applies the data voltages to the corresponding data lines $D_1$-$D_m$ during a turn-on time of switching elements Q due to application of the gate-on voltage $V_{on}$ thereto (which is called "1H" or "1 horizontal period" and equals a period of the horizontal synchronization signal Hsync, the data enable signal DE, and the gate clock CPV). The data signals supplied to the data lines $D_1$-$D_m$ are applied to corresponding pixels through the on-turned switching elements Q.

The difference between the common voltage $V_{com}$ and a data voltage applied to a pixel appears as a charged voltage of the liquid crystal capacitor $C_{LC}$, which is called pixel voltage. Liquid crystal molecules have orientations depending on the pixel voltage, and their orientations determine polarization of light passing through the liquid crystal capacitor $C_{LC}$. The polarizers convert the light polarization into the light transmittance.

By recursively applying the previously described process to subsequent gate lines, the gate-on voltage $V_{on}$ is sequentially applied to each of the gate lines $G_1$-$G_n$, during a frame, and therefore every pixel receives its data signal.

When a subsequent frame starts after a previous frame is finished, the inversion control signal RVS applied to the data driver 500 is controlled such that polarity of the data voltage applied to each pixel is reversed from that in the previous frame ("frame inversion"). Depending on the characteristic of the inversion control signal RVS, polarities of the data voltages that flows through the same data line may be altered in the same frame ("line inversion"), and polarity of a data voltage applied at one instance may also be altered ("dot inversion").

This process is hereinafter described in further detail.

The uppermost gate driving IC 440 that firstly receives the vertical synchronization start signal STV selects the gate-on voltage $V_{on}$ of the two voltages $V_{on}$ and $V_{off}$ of the driving voltage generator 700, and subsequently outputs the selected gate-on voltage $V_{on}$ to the first gate line $G_1$. Meanwhile, the gate-off voltage $V_{off}$ is applied to all the other gate lines $G_2$-$G_n$. Switching elements Q connected to the first gate line $G_1$ are conducted by the gate-on voltage $V_{on}$, and data signals for the first row are applied to the liquid crystal capacitors $C_{LC}$ and the storage capacitors $C_{ST}$ of all pixels in the first row through the switching elements Q.

When the charging of the capacitors $C_{LC}$ and $C_{ST}$ in the first row is finished in a predetermined period, the uppermost (i.e., first) gate driving IC 440 applies the gate-off voltage $V_{off}$ to the first gate line $G_1$ such that the switching elements Q connected thereto are turned off, and applies the gate on voltage $V_{on}$ to the second gate line $G_2$.

When every gate line has been at least once applied with the gate-on voltage $V_{on}$ according to this process, the first gate driving IC 440 supplies a carry signal, i.e., a signal for notifying finishing of scanning, to the second gate driving IC 440

At receiving the carry signal, the second gate driving IC 440 executes scanning, in the same way described above, for all gate lines connected thereto. When the scanning for all gate lines are finished, the second gate driving IC 440 supplies the carry signal to a subsequent gate driving IC 440 via the signal line 323c. When the final gate driving IC 440 finishes its scanning operation in this way, a frame becomes fully processed.

As described above, the liquid crystal panel assembly 300 includes two panels 100 and 200, wherein the lower panel 100 equipped with TFTs is called "TFT panel". The gate driving signal lines 321, 322, 323a-323d, and 324 in FIGS. 3A and 3B are formed on the TFT panel 100. Structural features of such a TFT panel 100 are hereinafter described in detail with reference to FIGS. 4-7.

Figure 4:
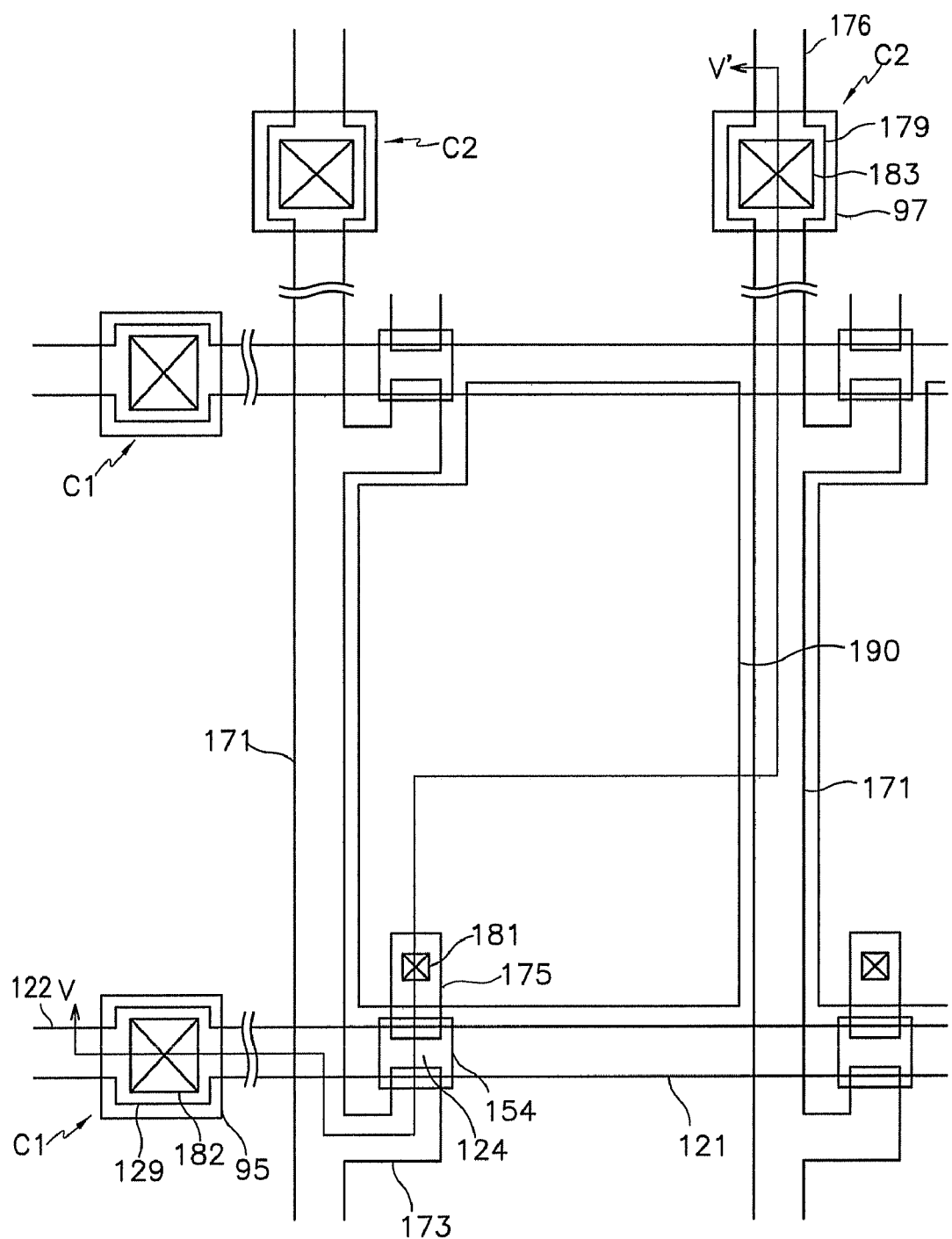
FIG. 4 illustrates arrangement of a TFT panel for an LCD according to a preferred embodiment of the present invention, in which intersecting area of data and gate lines of FIGS. 3A and 3B and contact portions respectively connected to the gate and data lines are enlarged.
Figure 5:
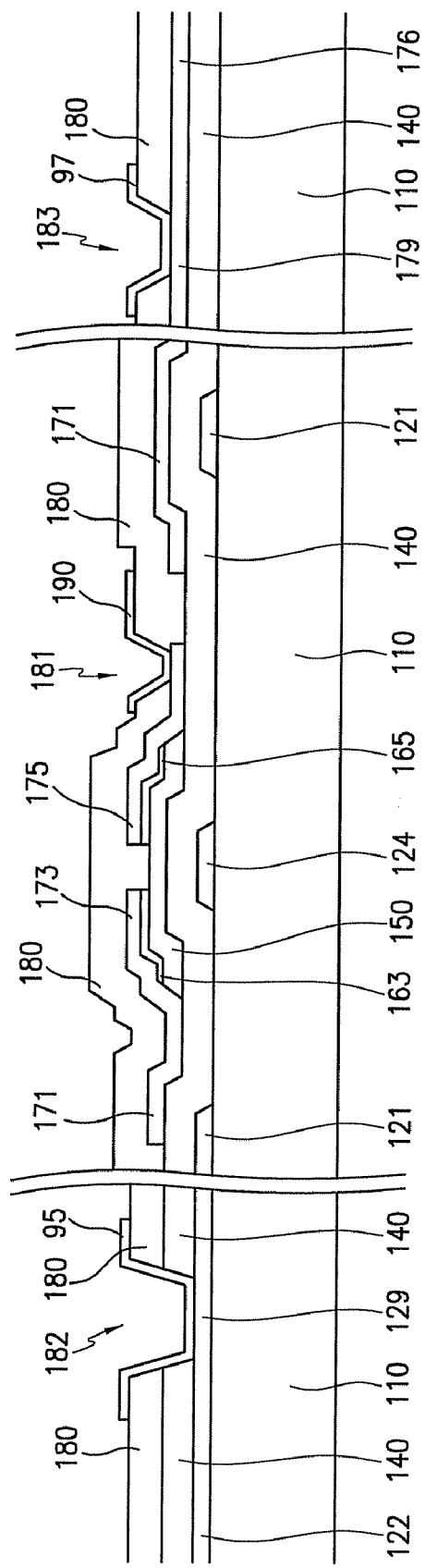
FIG. 5 is a sectional view of a TFT panel, the section being taken along line V-V' of FIG. 4.
Figure 6:
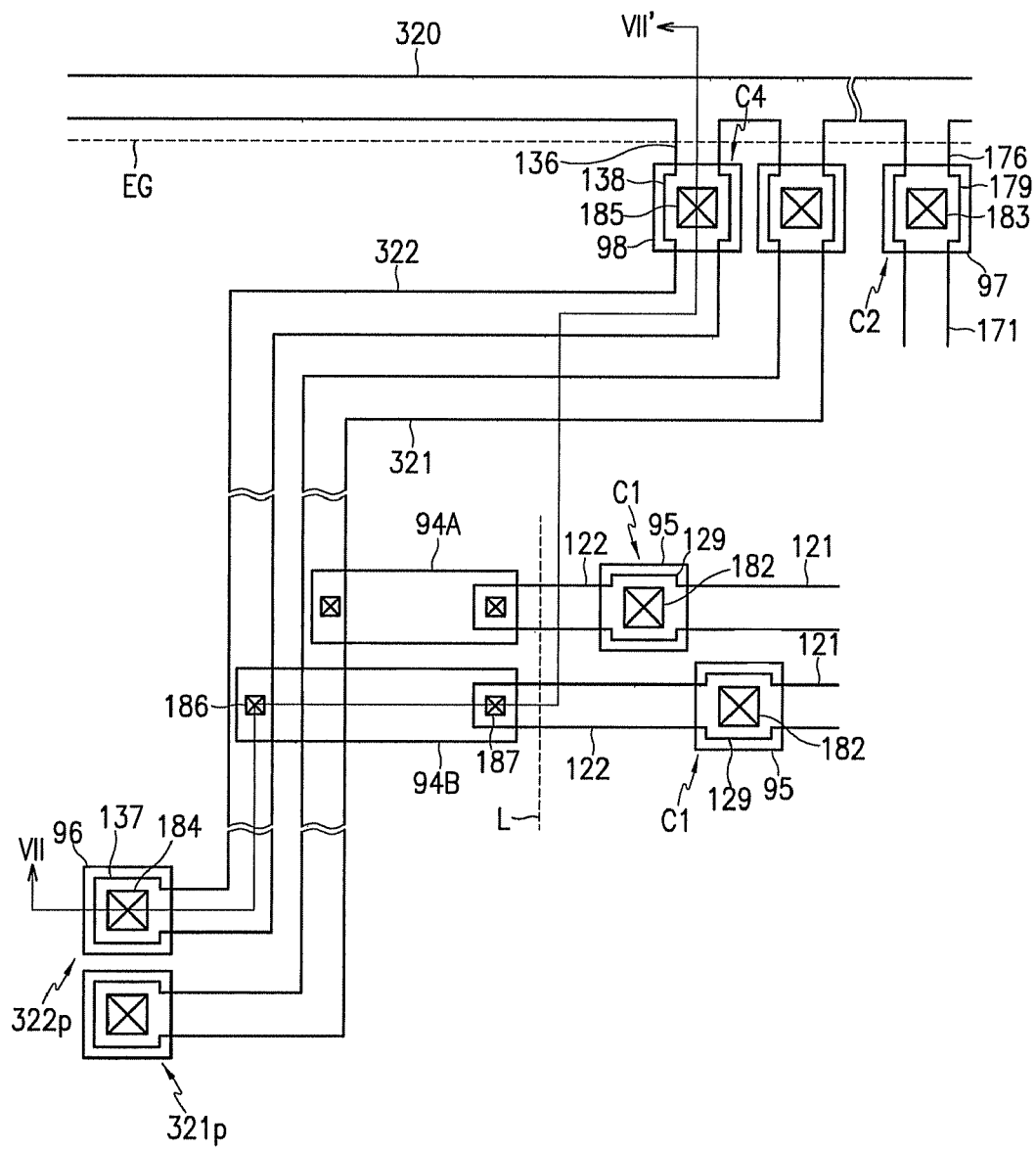
FIG. 6 shows an enlarged view for gate driving signal wire and shorting bar of FIG. 3A according to a preferred embodiment of the present invention.
Figure 7:
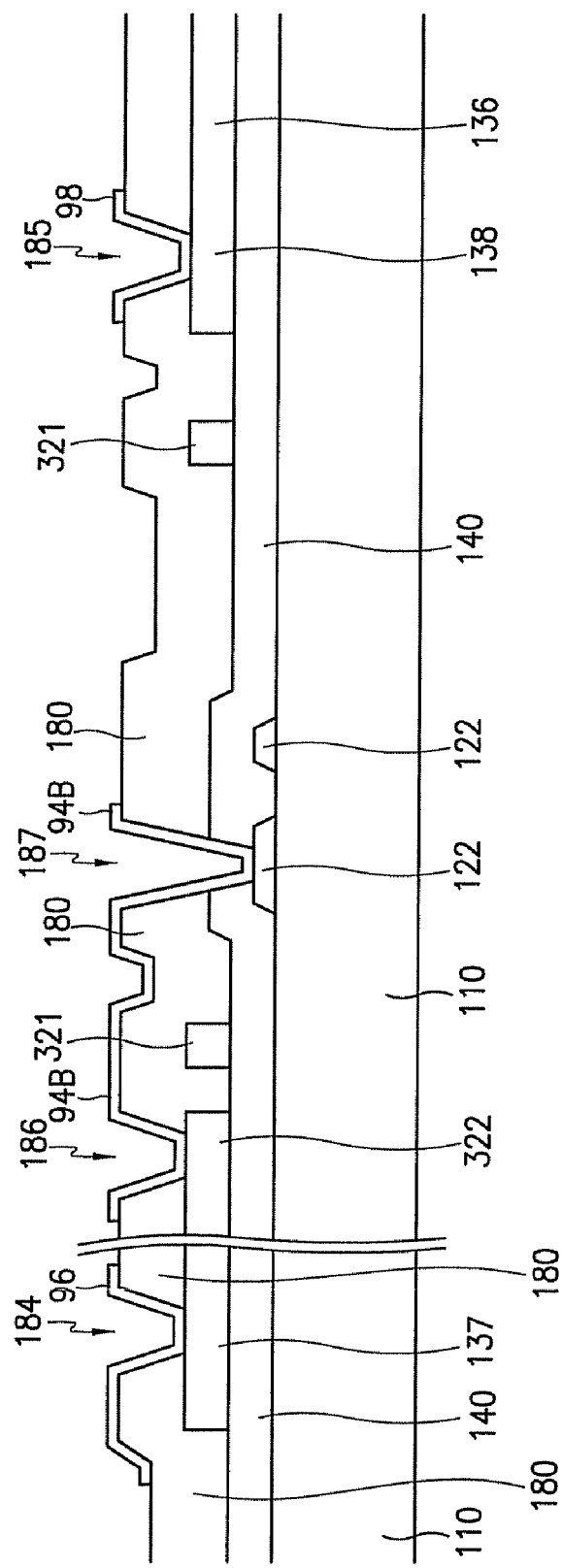
FIG. 7 is a sectional view of a TFT panel, the section being taken along line VII-VII' of FIG. 6.

FIG. 4 is a layout view of a TFT panel for an LCD according to an embodiment of the present invention, in which intersecting area of data and gate lines of FIGS. 3A and 3B and contact portions C1 and C2 respectively connected to the gate and data lines are enlarged. FIG. 5 is a sectional view of the TFT panel, the section being taken along line V-V' of FIG. 4. FIG. 6 shows an enlarged view for gate driving signal wire and shorting bar of FIG. 3A according to a preferred embodiment of the present invention. FIG. 7 is a sectional view of the TFT panel, the section being taken along line VII-VII' of FIG. 6.

Gate wire 121, 124, and 129 and connecting portions 122 are formed on an insulating substrate 110. The gate wire 121, 124, and 129 and the connecting portions 122 are made of metal or other conducting materials, and the metal used for the gate wire may be exemplified as Aluminum (Al) or its alloy, Molybdenum (Mo) or Molybdenum-Tungsten alloy (MoW), Chrome (Cr), and Tantalum (Ta).

The gate wire 121, 124, and 129 includes a plurality of gate lines 121 that horizontally extend, gate electrodes 124 of which each is a part of each the gate line 121, and gate pads 129 that are connected to ends of the gate electrodes 124 such that scanning signals received from outside at the gate pads 129 can be transmitted to the gate line 121. The connecting portion 122 extends from the gate pad 129 in a direction opposite to the gate line 124.

The gate wire 121, 124, and 129 and the connecting portion 122 may be formed as a single layer, however, may also be formed in a multi-layer structure. In the case of the multi-layer structure, it is preferable that one layer is made of low resistance material and other layers are made of material that shows good characteristic in electrical contact to different materials. The multi-layer structure may preferably be exemplified by a dual-layer of chrome and aluminum alloy, or molybdenum (or its alloy) and aluminum.

The gate wire 121, 124, and 129 and the connecting portion 122 are covered with a gate insulating layer 140 that is formed of, e.g., silicon nitride ($SiN_x$).

A semiconductor layer 150, being made of semiconductors such as amorphous silicon, is formed on the gate insulating layer 140 above the gate electrode 124. Ohmic contact layers 163 and 165 are formed on the semiconductor layer 150 dividedly to both sides of the gate electrode 124. The ohmic contact layers 163 and 165 are made of semiconductors such as amorphous silicon doped with n-type impurities, e.g., phosphorus (P).

Data wire 171, 173, 175, 176, and 179, gate driving signal wire 321, 322, 136, 137, and 138, and a shorting bar 320 are formed on the ohmic contact layer 163 and 165 and the gate insulating layer 140, and they are made of metal or other conducting materials, where the metal may be exemplified by Aluminum or its alloy, Molybdenum or Molybdenum-tungsten alloy, Chrome, and Tantalum The data wire 171, 173, 175, 176, and 179 includes a plurality of data lines 171 that vertically extend, source electrodes 173 of which each is branched from each the data line 171, drain electrodes 175 that are opposite to the source electrodes 173 over the gate electrodes 124, data pads 179 connected to the data lines 171 such that data signals received from outside at the data pads 179 can be transmitted to the data lines 171, and connecting portions 176 of which each interconnects a corresponding data pad 179 to the shorting bar 320.

The gate driving signal wire, 136, 137, and 138 includes a driving signal lines 321, 322, pads 137 and 138 that are respectively connected to both ends of the driving signal lines 321 and 322, and a connecting portion 136 that interconnects the pad 138 to the shorting bar 320.

The two pads 137 and 138 are respectively positioned, on the substrate 110, to the left margin in the lower left portion thereof and to the upper margin in the upper left portion thereof. The pad 138 positioned to the upper margin in the upper left portion receives the gate-off voltage $V_{off}$ and the ground voltage from the gate driving signal line 521 of the data FPC film 510 and transmits them to the driving signal lines 321 and 322. The pad 137 positioned to the left margin in the lower left portion is prepared for the purpose of inspection.

The data wire 171, 173, 175, 176, and 179, the gate driving signal wire 321, 136, 137, and 138, and the shorting bar 320 may be formed as a single layer, as same as the gate wire 121, 124, and 129. And they may also be formed in a multi-layer structure. In the case of the multi-layer structure, it is preferable that one layer is made of low resistance material and other layers are made of material that shows good characteristic in electrical contact to different materials.

Here, the gate electrode 124, the semiconductor layer 150, the source electrode 173, and the drain electrode 175 form a TFT.

A protective layer 180 made of silicon nitride or organic insulating materials covers the data wire 171, 173, 175, 176, and 179, the gate driving signal wire 321, 322, 136, 137, and 138, and the shorting bar 320. And it also covers open portions of the semiconductor layer 150 and the gate insulating layer 140. The protective layer 180 has contact holes 183 and 185 that respectively expose the data pad 179 at the contact portion C2 and the pad 138 of the gate driving signal wire at the contact portion C4. The protective layer 180 also has contact holes 184 and 186 that respectively expose the pad 137 of the gate driving signal wire and the driving signal lines 321, 322, and a contact hole 181 that exposes the drain electrode 175.

At the contact portion C1, the protective layer 180 further has contact holes 182 and 187 that respectively expose the gate pad 129 and the connecting portion 122 at the contact portion C1.

A pixel electrode 190, an auxiliary gate pad 95, an auxiliary data pad 97, auxiliary pads 96 and 98 of the gate driving wire, and a connecting member 94A and 94B are formed on the protective layer 180, and they are made of transparent conducting materials such as ITO (indium tin oxide) or IZO (indium zinc oxide).

The pixel electrode 190 is connected to the drain electrode 175 through the contact hole 181 and receives data signals therefrom. The auxiliary gate pad 95 and the auxiliary data pad 97 are respectively connected to the gate pad 129 through the contact hole 182 and to the data pad 179 through the contact hole 183, and they enhances adhesion of the pads 129 and 179 to an exterior circuital apparatus as well as protection of the pads 129 and 179. The auxiliary pads 96 and 98 are respectively connected to the pads 137 and 138 of the gate driving signal wire through the contact holes 184 and 185. The connecting member 94B is connected to the driving signal line 322 through the contact hole 186, and also connected to the connecting portion 122 through the contact hole 187.

The driving signal lines 321 and 322 are very wide in comparison with other signal lines, and therefore, pads connected thereto may be sized as same as the line width thereof.

A VI test method for inspecting state of the gate lines $G_1$-$G_m$ of a such structured LCD is hereinafter described with reference to the drawings.

Firstly, when the liquid crystal panel assembly 300 is manufactured, an edge grinding process that eliminates unnecessary portions of the liquid crystal panel assembly 300 is performed along the cutting line EG (see, FIGS. 3A and 3B). By this procedure, the shorting bar 320 is also eliminated.

A probe (not shown) of an inspecting apparatus is put in contact to the contact portion (e.g., C4) and the test pad (e.g., 321p) of one (e.g., the signal line 321) of the two signal lines 321 and 322 connected to the gate lines $G_1$-$G_n$, and then a gate test signal having a voltage (e.g., gate-on voltage $V_{on}$) sufficient to turn on the switching elements Q is applied thereto. Accordingly, the gate-on voltage $V_{on}$ is applied to all the gate lines connected to the signal line (e.g., 321) by the contact portions (e.g., C1), and therefore, all the corresponding switching elements Q are turned on.

In this state, using the inspection apparatus, a data test signal is supplied to all the data lines $D_1$-$D_m$ through the contact portions C2. Accordingly, pixels on the gate line supplied with the gate-on voltage $V_{on}$ become as bright as correspondent to the voltage of data test signal. Black and white colors are usually used in order to enhance comparison of brightness in the VI test.

Subsequently, a human inspector inspects the display state such as brightness of pixels with his/her eye, and determines its operation state such as broken lines in the gate and data lines if any.

When a VI test for gate lines connected to the driving signal line 321 is finished, supplying of test signal to the driving signal line 321 is terminated. Subsequently, by supplying a new test signal to the driving signal line 322 through the contact portion C4 and the test pad 322P, a VI test for the remnant gate lines connected to the driving signal line 322 is performed in the same manner as described above.

When VI tests for all the gate lines $G_1$-$G_n$ are finished, the connecting portions 122 are cut along a cutting line L between the contact portions C1 and the driving signal lines 321 and 322 using an appropriate apparatus such as a laser trimming device. Originally, one end of the connecting members 94A and 94B are connected to the driving signal lines 321 and 322, and another end thereof is connected to the gate wire 121 and 129 via the connecting portion 122. When the connecting portion 122 is cut along the cutting line L between the contact portions C1 and the signal lines 321 and 322, two sections are created. In one exemplary embodiment, as a first section, connecting member 94A and 94B are each connected to a part of a respective connecting portion 122 on one side of the line L, and as a second section, the remaining connecting portions 122 on an opposing side of the line L are connected to gate wire 121 and 129, the first and second sections being electrically separated from each other. The disconnected two sections are respectively connected to the gate wire 121 and 129 and the driving signal lines 321 and 322. By using signal lines 321 and 322 that transmit signals for driving the gate driving ICs as described above, separate test wire or pads that had to be prepared according to the prior art can be eliminated, and thus spatial rooms for designing a panel increases. Furthermore, accuracy of the VI test is enhanced by using the signal lines 321 and 322 because they show low resistance due to their big line width comparatively to other signal wire.

In addition, because the signal lines 321 and 322 are big in line width, the contact portions C3 for contacts to the gate driving ICs 440 are formed directly on the signal lines 321 and 322, and their size is big in accordance with the line width of the signal lines 321 and 322. Accordingly, VI tests can be executed by applying test signals directly to the contact portions C3 that are repeatedly positioned on the signal lines 321 and 322, instead of applying the test signals to ends of the signal lines.

Structural features of a TFT panel according to another preferred embodiment of the present invention are hereinafter described in detail with reference to FIGS. 8 and 9.

Figure 8:
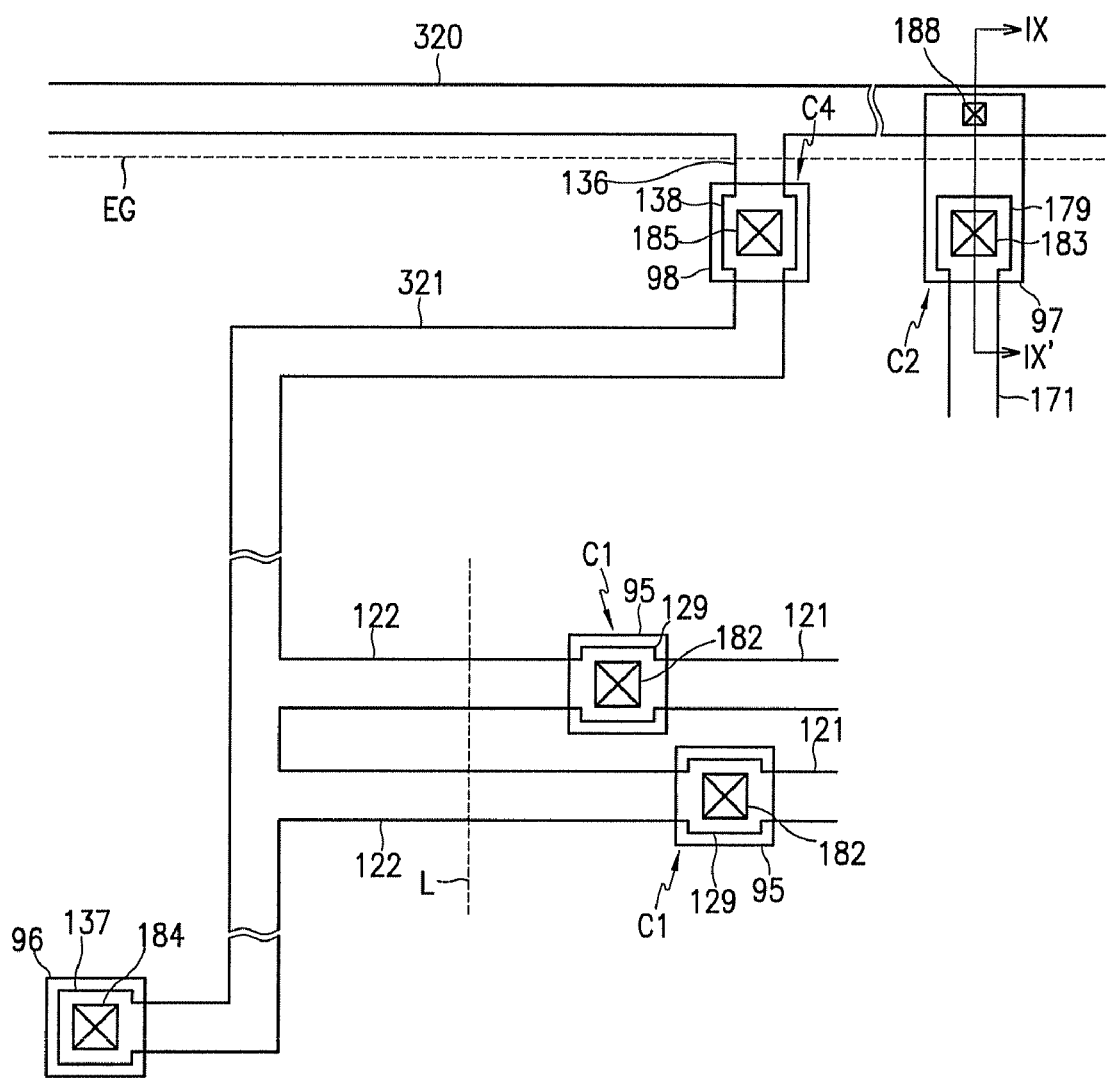
FIG. 8 shows an enlarged view for gate driving signal wire and shorting bar of FIG. 3A according to a second preferred embodiment of the present invention.
Figure 9:
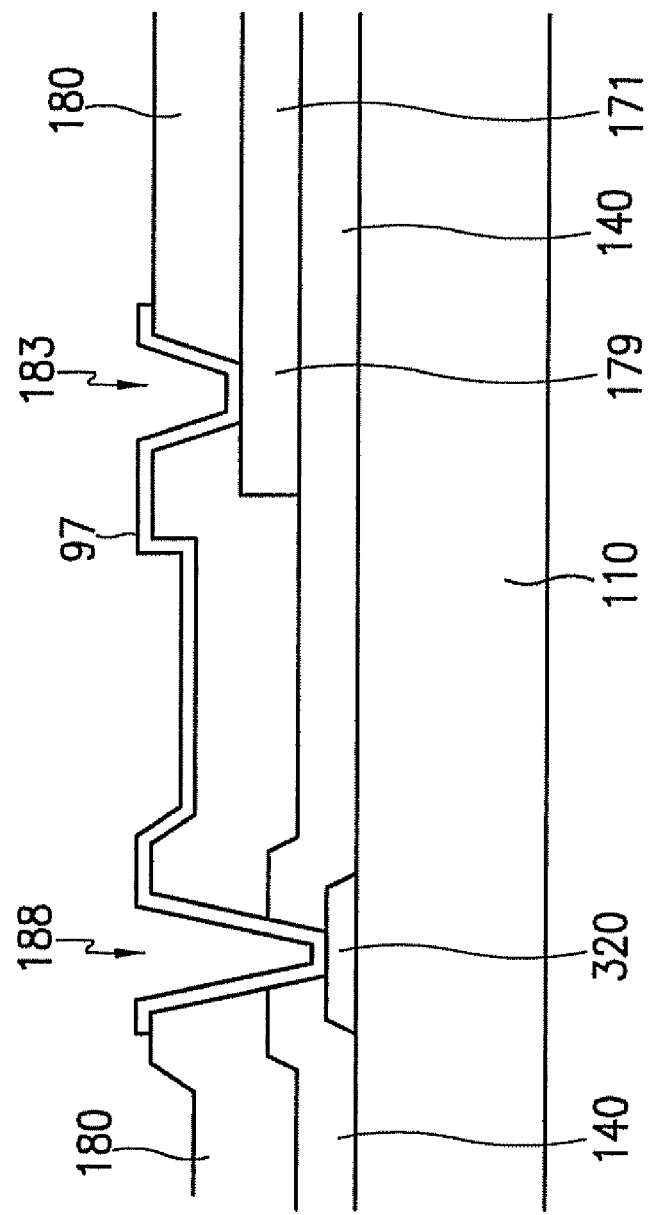
FIG. 9 is a sectional view of a TFT panel, the section being taken along line IX-IX' of FIG. 8.

FIG. 8 shows an enlarged view of gate driving signal wire and shorting bar of FIGS. 3A and 3B according to a second preferred embodiment of the present invention, and FIG. 9 is a sectional view of a TFT panel, the section being taken along line IX-IX' of FIG. 8.

Two driving signal lines 321 and 322 for VI tests are shown in FIGS. 3A, 3B, 6, and 7. However, according to this embodiment, only one signal line is used, and therefore all the gate lines $G_1$-$G_n$ are commonly connected to the one signal line.

In addition, the shorting bar 320 and the gate driving signal wire 321,136, 137, and 138 are formed as the same layer as the data wire 171, 173, 175, 176, and 179 according to the first embodiment, but they are formed as the same layer as the gate wire 121, 124, and 129 according to this embodiment. Therefore, the connecting portions 122 directly interconnect the gate driving signal lines 321 and the gate pads 129 without an additional connecting member. Meanwhile, the auxiliary data pad 97 is elongated to interconnect the data pad 179 and the shorting bar 320.

In other words, the shorting bar 320 and the gate driving signal wire 321, 136, 137, and 138 are interposed between the substrate 110 and the gate insulating layer 140, and contact holes 184 and 185 that expose the gate driving signal wire 137 and 138 are formed through the protective layer 180 and the gate insulating layer 140. In addition, the contact hole 188 that exposes the shorting bar 320 is formed through the protective layer 180 and the gate insulating layer 140, and the auxiliary data pad 97 is connected to the shorting bar 320 through the contact hole 188.

In the above described embodiments, the gate driver is directly mounted on the liquid crystal panel assembly 300 in the form of a chip. However, the spirit of the present invention may also be realized in another embodiment wherein the gate driver is formed directly on the panel assembly 300 by a process as same as for TFTs, gate lines, and data lines, or in another embodiment wherein a plurality of gate driving ICs are mounted on the gate FPC film. In the case of the latter mentioned embodiment, a plurality of the gate driving signal lines are formed on the gate FPC film, and the gate driving signal lines formed on the liquid crystal panel assembly 300 functions as connectors between separate gate FPC films or between a gate FPC film and a data FPC film.

Figure 10:
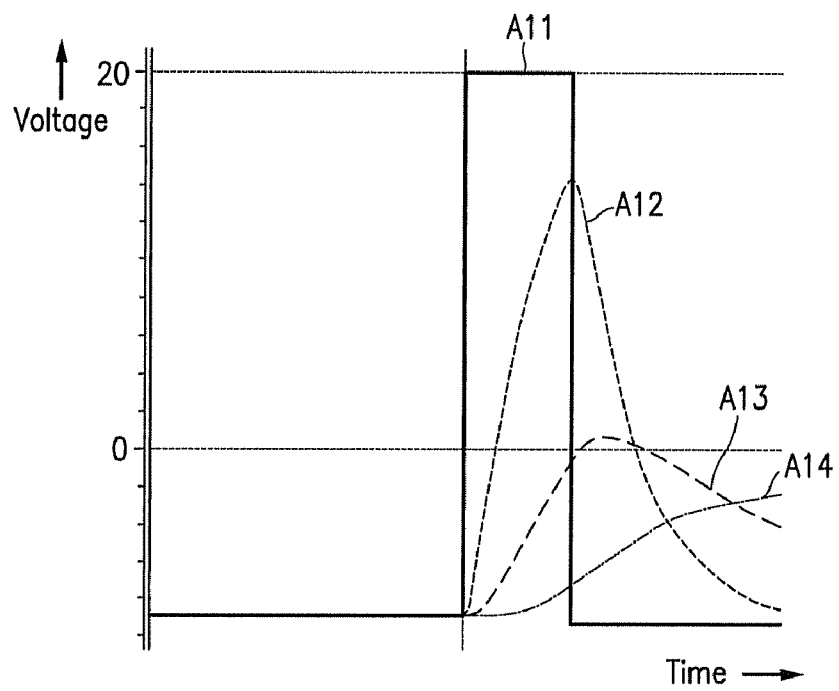
FIG. 10 illustrates waveform of gate test signal for LCDs of the prior art and a preferred embodiment of the present invention.
Figure 11:
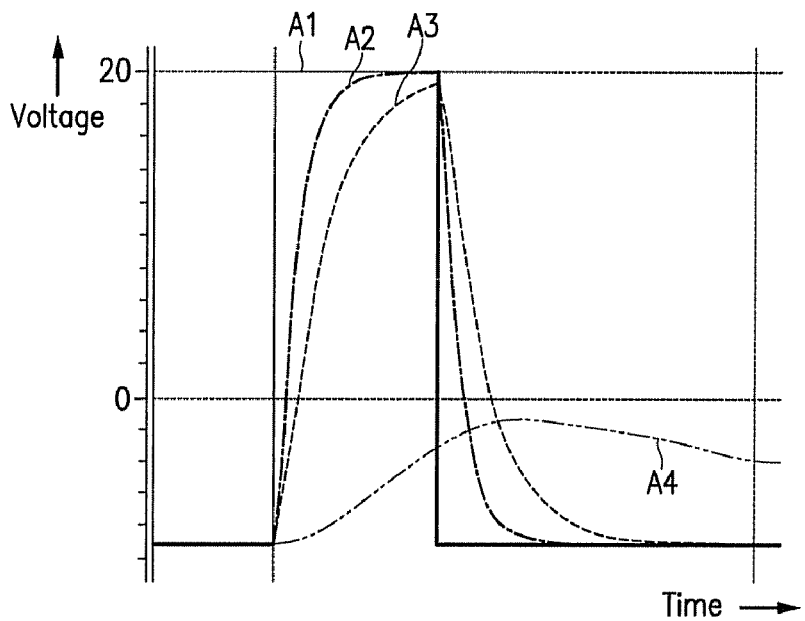
FIG. 11 illustrates waveform of gate test signal for LCDs of the prior art and a second preferred embodiment of the present invention.

Exemplary waveforms of gate test signals for such VI tests are shown in FIGS. 10 and 11.

FIG. 10 illustrates waveform of gate test signal for LCDs of the prior art and the first embodiment of the present invention.

According to an LCD of the first embodiment of the present invention, gate lines are alternately connected to two gate driving signal lines 321 and 322 of which each has two pads 137 and 138. According to an LCD of the prior art, two test wires are further included in addition to the gate driving signal wire, and gate lines are alternately connected to the two test wires of which each has one test pad at its end. A gate test signal having a waveform of A11 shown in FIG. 10 is applied to each of the LCDs, and then waveforms A12-A14 of signals output from the gate line is observed.

In more detail, regarding an LCD according to a preferred embodiment of the present invention, the gate signal A11 is applied to the two pads 137 and 138, and resultantly, waveforms A12 and A13 are observed at a gate line most distal to both of the pads 137 and 138, i.e., a gate line positioned at an approximate center of the liquid crystal panel assembly 300.

Regarding an LCD of the prior art, the gate test signal A11 is applied to the only test pad prepared at an end of the separate test wire, and resultantly, waveform A14 is observed at a gate line most distal to the test pad, i.e., a gate line positioned to an approximate edge of the liquid crystal panel assembly 300.

As shown in FIG. 10, output waveforms A12 and A13 according to an embodiment of the present invention show less delay and reduction in output signal than the output waveform A14 according to the prior art.

The output waveform A12 is observed from an LCD of "separate wire type", and the output waveform A13 is from an LCD of "previous gate type".

FIG. 11 illustrates waveform of gate test signal for LCDs of the prior art and a second preferred embodiment of the present invention.

According to a tested LCD of the second embodiment of the present invention, all the gate lines are connected to one gate driving signal line 321 that has two pads 137 and 138, as shown in FIG. 8. For comparison, an LCD of the prior art as described with reference to FIG. 10 is prepared and tested.

The gate test signal of the waveform A1 shown in FIG. 11 is applied to the same position as was in the case of FIG. 10, and output waveforms are also observed at the same position as was in the case of FIG. 10. Regarding LCDs according to embodiments of the present invention, waveform A2 is observed from an LCD of separate wire type, and waveform A3 is observed from an LCD of previous gate type. Waveform A4 is observed from an LCD of the prior art.

As shown in FIG. 11, output waveforms A2 and A3 according to embodiments of the present invention show less delay and reduction in output signal than the output waveform A4 according to the prior art.

The same VI test process as described above can be applied to an LCD in which the data driving signal wire is connected to the data lines $D_1$-$D_m$, as was applied to an LCD in which the gate driving signal wire is connected to the gate lines $G_1$-$G_n$.

In more detail, the gate-on voltage $V_{on}$ is applied to the gate lines $G_1$-$G_n$ with an inspecting apparatus, and accordingly all the corresponding switching elements Q are turned on. And then the test signal is applied to both of the contact portion contacting to the wire of FPC film and the test pad of the data driving signal wire connected to the data lines $D_1$-$D_m$ of the data driving signal wire. Subsequently, pixels on the data lines that is receiving the test signal, gate lines and data lines are inspected. The same VI test process as described above can be applied to the case of an LCD in which all the data lines $D_1$-$D_m$ are commonly connected to one data driving signal line.

Spatial rooms for designing a panel increases because VI test is executed by using some lines of gate and data driving signal wire without additional test wire and test pad, and accuracy in signal transmission is enhanced due to reducing of signal interference caused by close line spacing in wire. Furthermore, accuracy of the VI test is enhanced by using the signal lines for gate-off and ground voltages that show low resistance due to their big line width comparatively to other signal wire.

Although connecting portions between the pad and the gate driving signal wire (or between the pad and the data driving signal wire) are divided as a result of the VI test, some of them remain connected to the gate driving signal wire (or the data driving signal wire), and accordingly functions as parallel resistors. Therefore, resistance of the gate driving signal wire (or the data driving signal wire) is reduced, and accordingly efficiency in signal transmission is enhanced.

In addition, accuracy of test is also enhanced due to reduction in signal delay because the test signal is transmitted to the gate lines or data lines through both pads.

Furthermore, the driving signal lines are very wide, and the pads connected thereto are also so wide in accordance to the driving signal lines. Hence, accuracy of manual operation in the test is also enhanced since manual operations for applying the test signal becomes easier.

In addition, the test signal is not applied to the pads connected to both ends of the driving signal wire, and the size of the contact portions that are directly connected to the driving signal wire for a contact to the driving ICs becomes wide in accordance with the line width of the driving signal lines. Therefore, signal delay is further reduced when the test signal is applied to the contact portions.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A liquid crystal display device comprising:
a substrate;
a gate driver disposed on the substrate;
a gate line connected to the gate driver and comprising a gate pad;
a data line disposed substantially perpendicular to the gate line;
a thin film transistor connected to the gate line and the data line;
a pixel electrode connected to the thin film transistor; and
a driving signal wire which transmits driving signals from an outside of the substrate to the gate driver and which comprises a first protrusion portion extended toward the gate pad,
wherein the gate pad comprises a second protrusion portion extended toward the driving signal wire and the first protrusion portion is adjacent to and insulated from the second protrusion.

2. The liquid crystal display device of claim 1, wherein the driving signal wire is separated from the gate line, the data line, the thin film transistor, and the pixel electrode.

3. The liquid crystal display device of claim 2, further comprising:
a test pad and a first driving pad disposed on the substrate; and
a flexible printed circuit connected to the substrate through the first driving pad,
wherein a first end of the driving signal wire is connected to the test pad and a second end of the driving signal wire is connected to the first driving pad.

4. The liquid crystal display device of claim 3, further comprising a second driving pad disposed on the substrate;
wherein the gate driver connects to the driving signal wire through the second driving pad.

5. The liquid crystal display device of claim 4, wherein the driving signal wire is supplied with a test signal.

6. A liquid crystal display device comprising:
a substrate;
a plurality of gate drivers disposed on the substrate;
a plurality of gate lines respectively connected to the plurality of gate drivers, each of the plurality of gate lines comprising a gate pad;
a plurality of data lines disposed substantially perpendicular to the plurality of gate lines;
a plurality of thin film transistors, each of the plurality of thin film transistors connected to one of the plurality of gate lines and one of the plurality of data lines;
a plurality of pixel electrodes respectively connected to the plurality of thin film transistors;
a first driving signal wire which transmits driving signals from an outside of the substrate to the plurality of gate drivers, and
a plurality of first connecting portions disposed between the first driving signal wire and the gate pad of each of the plurality of gate lines,
wherein a first end of each of the plurality of first connecting portions is connected to the first driving signal wire and a second end of each of the plurality of first connecting portions is connected to the gate pad and each of the plurality of first connecting portions is divided into two parts.

7. The liquid crystal display device of claim 6, further comprising:
a second driving signal wire which transmits driving signals from an outside of the substrate to the plurality of gate drivers; and
a plurality of second connecting portions disposed between the second driving signal wire and the gate pad of each of the plurality of gate lines,
wherein a first end of each of the plurality of second connecting portions connect to the second driving signal wire and a second end of each of the plurality of second connecting portions connects to the gate pad and each of the plurality of second connecting portions is divided into two parts.

8. The liquid crystal display device of claim 7, wherein the first driving signal wire and the second driving signal wire are separated from the plurality of gate lines, the plurality of data lines, the plurality of thin film transistors, and the plurality of pixel electrodes.

9. The liquid crystal display device of claim 8, further comprising:
a first test pad disposed on the substrate;
a second test pad disposed on the substrate;
a first driving pad and a second driving pad disposed on the substrate; and
a flexible printed circuit connected to the substrate through the first driving pad and the second driving pad,
wherein a first end of the first driving signal wire connects to the first test pad and a second end of the first driving signal wire connects to the first driving pad and a first end of the second driving signal wire connects to the second test pad and a second end of the second driving signal wire connects to the second driving pad.

10. The liquid crystal display device of claim 9, wherein a distance between the first driving signal wire and the gate pad of each of the plurality of gate lines is smaller than a distance between the second driving signal wire and the gate pad of each of the plurality of gate lines.

11. The liquid crystal display device of claim 10, wherein the plurality of first connecting portions and the plurality of second connecting portions are alternately disposed.

12. The liquid crystal display device of claim 11, wherein the gate driver comprises a third driving pad connected the first driving signal wire and a fourth driving pad connected the second driving signal wire.

13. The liquid crystal display device of claim 12, wherein the first driving signal wire and the second driving signal wire are supplied with a test signal.

* * * * *